(12) United States Patent
Wakabayashi et al.

(10) Patent No.: US 9,186,835 B2
(45) Date of Patent: Nov. 17, 2015

(54) PROCESS FOR PRODUCING EXFOLIATED AND/OR DISPERSED POLYMER COMPOSITES AND/OR NANOCOMPOSITES VIA SOLID-STATE/MELT EXTRUSION (SSME)

(71) Applicant: Bucknell University, Lewisburg, PA (US)

(72) Inventors: Katsuyuki Wakabayashi, Lewisburg, PA (US); Stephen M. Brouse, Kreamer, PA (US); Michael D. Boches, Pliladelphia, PA (US)

(73) Assignee: Bucknell University, Lewisburg, PA (US)

( * ) Notice: Subject to any disclaimer, the term of this patent is extended or adjusted under 35 U.S.C. 154(b) by 643 days.

(21) Appl. No.: 13/654,154

(22) Filed: Oct. 17, 2012

(65) Prior Publication Data

US 2013/0113135 A1    May 9, 2013

Related U.S. Application Data

(60) Provisional application No. 61/547,954, filed on Oct. 17, 2011.

(51) Int. Cl.
*B29C 47/78* (2006.01)
*B29C 47/00* (2006.01)
(Continued)

(52) U.S. Cl.
CPC ............ *B29C 47/0004* (2013.01); *B29B 7/484* (2013.01); *B29B 7/90* (2013.01); *B29C 47/0011* (2013.01); *B29C 47/0014* (2013.01); *B29C 47/402* (2013.01); *B29C 47/6031* (2013.01); *B29C 47/6056* (2013.01); *B29C 47/64* (2013.01); *B29C 47/827* (2013.01); *B29C 47/92* (2013.01); *B29C 47/1045* (2013.01); *B29C 2947/92209* (2013.01); *B29C 2947/92704* (2013.01); *B29K 2105/16* (2013.01); *B29K 2105/162* (2013.01)

(58) Field of Classification Search
CPC ............ B29C 47/0004; B29C 47/6031; B29C 47/402; B29B 7/484; B29B 7/90
USPC ..................................... 264/211.24
See application file for complete search history.

(56) References Cited

U.S. PATENT DOCUMENTS 5,395,055 A    3/1995    Shutov et al.
5,397,065 A    3/1995    Shutov et al.
(Continued)

FOREIGN PATENT DOCUMENTS

EP    0596835 A1    5/1994
KR    20100051992 A    5/2010

OTHER PUBLICATIONS

Polymer-Graphite Nanocomposites: Effective Dispersion and Major Property Enhancement via Solid-State Shear Pulverization; Katsuyuki Wakabayashi et al. ; Macromolecules 2008, 41, 1905-1908.*

(Continued)

*Primary Examiner* — Joseph S. Del Sole
*Assistant Examiner* — John Robitaille
(74) *Attorney, Agent, or Firm* — Reinhart Boerner Van Deuren S.C.

(57) ABSTRACT

A method for solid-state/melt extrusion, as can be accomplished using a unitary extruder apparatus comprising a solid-state shearing zone and a melt-state extrusion zone.

14 Claims, 3 Drawing Sheets

(51) Int. Cl.
- *B29C 47/92* (2006.01)
- *B29B 7/48* (2006.01)
- *B29B 7/90* (2006.01)
- *B29C 47/40* (2006.01)
- *B29C 47/60* (2006.01)
- *B29C 47/64* (2006.01)
- *B29C 47/82* (2006.01)
- *B29K 105/16* (2006.01)
- *B29C 47/10* (2006.01)

(56) References Cited

U.S. PATENT DOCUMENTS

| | | | |
|---|---|---|---|
| 5,747,560 | A | 5/1998 | Christiani et al. |
| 5,904,885 | A | 5/1999 | Arastoopour et al. |
| 6,818,173 | B1 | 11/2004 | Khait |
| 7,223,359 | B2 | 5/2007 | Torkelson et al. |
| 7,906,053 | B1 | 3/2011 | Torkelson et al. |
| 2002/0125595 | A1 | 9/2002 | Tunc |
| 2008/0176980 | A1 | 7/2008 | Torkelson et al. |
| 2009/0192254 | A1 | 7/2009 | Williamson et al. |
| 2009/0318641 | A1 | 12/2009 | Guo et al. |
| 2010/0125108 | A1 | 5/2010 | Lau et al. |
| 2011/0028633 | A1 | 2/2011 | Moad et al. |
| 2011/0160345 | A1 | 6/2011 | Cooper et al. |
| 2011/0220851 | A1 | 9/2011 | Sue et al. |

OTHER PUBLICATIONS

Pulverization of rubber granulates using the solid-state shear extrusion SSSE/ process: Part I. Process concepts and characteristics; E. Bilgili et al.; Powder Technology 115 2001. 265-276.*

Masuda, Jun'ichi; Torkelson, John M., "Dispersion and Major Property Enhancements in Polymer/Multiwall Carbon Nanotube Nanocomposites via Solid-State Shear Pulverization Followed by Melt Mixing", Macromolecules, 2008, vol. 41. No. 16, pp. 5974-5977.

International Search Report for PCT/US2012/060615, dated Feb. 25, 2013.

Brouse, Stephen et al., Polymer Processing by Simultaneous Solid-State and Melt-State Extrusion (SSMSE), Presented at the 2011 Annual Student Conference of AICHE, https://aiche.confex.com/aiche/2011asc/webprogram/Paper242749.html.

* cited by examiner

PROCESS FOR PRODUCING EXFOLIATED AND/OR DISPERSED POLYMER COMPOSITES AND/OR NANOCOMPOSITES VIA SOLID-STATE/MELT EXTRUSION (SSME)

This application claims priority benefit from provisional application Ser. No. 61/547,954 filed Oct. 17, 2011—the entirety of which is incorporated herein by reference.

This invention was made with government support under grant number CMMI#0820993 awarded by the National Science Foundation. The government has certain rights in the invention

FIELD OF INVENTION

The present invention relates generally to the extrusion of polymer composites and/or nanocomposites, and more specifically, to exfoliation and/or dispersion of aggregated filler particles in polymer composites and/or nanocomposites using solid-state shear pulverization and melt-state extrusion in a single, continuous apparatus.

BACKGROUND

Although twin-screw extrusion (TSE) has long been established as one of the most prominent techniques for processing pure polymers as well as polymer composites and nanocomposites, the shear mixing in TSE is often not sufficiently rigorous to exfoliate (separate) and/or disperse (spread) the fillers in composites and nanocomposites. In addition, a long period of exposure to high temperature conditions in TSE can lead to thermal degradation of the materials. These limitations often render TSE ineffective for producing high-performance polymer composites and/or nanocomposites. The solid-state shear pulverization (SSSP) technique has recently been proven as a novel technique to achieve better exfoliation and/or dispersion in polymer composite and/or nanocomposite systems relative to TSE. However, the SSSP technique yields a powder as output or extrudate, which for some intended applications, e.g., those requiring injection molding of the output to shape/mold into a product, is less desirable in terms of ease of handling and safety than the pelletized output from melt extrusion. Furthermore, even when SSSP is followed by melt-extrusion, there would be energy requirements from the two separate instruments, making this two-step process somewhat energy inefficient.

Therefore, a need exists for an extrusion approach that not only achieves good exfoliation and/or dispersion in polymer composites and/or nanocomposites, but also facilitates the production of a non-powder output, thereby eliminating safety concerns and/or problems with powder handling, in a single instrument. In addition, there is a need to develop an approach that is much more energy efficient than the two-step SSSP followed by melt extrusion approach.

SUMMARY OF INVENTION

In light of the foregoing, it is an object of the present invention to provide one or more methods comprising a combination of solid-state shear pulverization and melt-state extrusion, together with a single self-contained apparatus useful in conjunction therewith. It would be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide a methodology for production of non-powder polymer composites/nanocomposites, thereby avoiding certain concerns relating to standard pulverization procedures.

It can also be an object of the present invention to provide such a methodology using a single, unitary apparatus, so as to avoid material transfer from one apparatus to another during production.

It can be another object of the present invention, alone or in conjunction with one or more of the preceding objectives, to provide an energy efficient process for producing composite and/or nanocomposite materials with enhanced physical and/or mechanical properties, as compared to prior art pulverization, alone, prior art melt extrusion, alone, or a combination of such processes via separate apparatus.

Other objects, features, benefits and advantages of the present invention will be apparent from this summary and the following descriptions of certain embodiments, and will be readily apparent to those skilled in the art having knowledge of various polymer composite and/or nanocomposite production techniques. Such objects, features, benefits and advantages will be apparent from the above as taken into conjunction with the accompanying examples, data, and all reasonable inferences to be drawn therefrom.

The invention can provide an approach for effectively exfoliating (separating) and/or dispersing (spreading) filler particles in polymer composite and/or nanocomposite materials by processing the polymer and filler in a single twin-screw pulverization/extrusion instrument, thereby yielding products with desired composite and/or nanocomposite morphology and superior physical properties. A method of this invention can be referred to as "Solid-State/Melt Extrusion" (SSME), in that it can combine various principles of solid-state shear pulverization (SSSP) and twin-screw extrusion (TSE) into one continuous processing method in a single apparatus.

Accordingly, one aspect of the invention can be a method of extruding a polymer using SSME. In one embodiment, such a method can comprise (a) feeding a mixture of polymer and filler and/or nanofiller into an extruder; (b) solid-state shearing the mixture in an initial zone of the extruder; (c) warming the mixture from a relatively low temperature to a warmer temperature in a transition zone of the extruder; (d) mixing and heating the mixture above about the melting point of semi-crystalline polymers or above about the glass transition temperature of amorphous polymers; and (e) extruding the mixture.

Another aspect of this invention can be a method of using a unitary solid-state shearing/melt-state extruder apparatus to prepare a polymer composite and/or nanocomposite. Such a method can comprise providing a unitary extruder apparatus comprising a solid-state shearing zone and melt-state extrusion zone; introducing a polymer component and a filler and/or nanofiller component into such an apparatus to provide a mixture thereof; solid-state shearing such a mixture in an initial zone of such an apparatus at a temperature sufficient to maintain such a polymer component in a solid state during shearing; warming such a mixture in a transition zone of such an apparatus, with warming at temperature less than about the melting point or less than about the glass transition temperature of such a polymer component; and heating such a mixture in an end zone of such an apparatus at a temperature above about the melting point or above about the glass transition temperature of such a polymer component; with continued mixing of such a mixture. In certain embodiments, such a unitary apparatus can comprise a single or multi-screw extruder configuration. In certain such embodiments, a twin-screw extruder can be employed.

Regardless, a polymer component useful with a method of this invention can be selected from, but is not limited to, polyesters, polyolefins, polyamides, epoxies, polycarbonates, polyacrylates, polyvinyls, polyethers, polyacrylonitriles, polyacetals, polysiloxanes, polyetherketones, elastomers, polyimides, polyurethanes, polystyrenes, copolymers thereof, combinations of such polymers, combinations of such copolymers and combinations of such polymers and copolymers. Various other polymer components useful with such a methodology will be understood by those skilled in the art made aware of this invention. A filler component can be selected from, but is not limited to, cellulose, rice husk ash, talc, silica, modified or unmodified clays, alumina, silicon carbide, silicon nitride, zirconia, glass fibers, glass particles, carbon black, carbon fiber, fullerenes modified or unmodified graphites, graphene, single- and multi-walled carbon nanotubes, boron, metal particles, (e.g., magnesium, titanium, gold, etc.) and combinations thereof. Various other useful filler components, whether or not nanodimensioned, will be understood by those skilled in the art made aware of this invention. Regardless, such a filler component can comprise about 0.01 wt. % to about 99.99 wt. % of a filler-polymer mixture. Filler content is limited only by an amount needed for desired functional effect (e.g., to effect a desired mechanical and/or physical property) in the context of a resulting polymer composite and/or nanocomposite. In certain such embodiments, such a filler component can comprise about 0.5 wt. % to about 10.0 wt. % of such a mixture.

In one non-limiting embodiment, an apparatus useful with a method of this invention can comprise (a) a feed zone for receiving a mixture of polymer and filler and/or nanofiller; (b) an initial zone for solid-state shearing the mixture; (c) a transition zone for warming the mixture from a relatively low temperature to warmer temperature; (d) an end zone for heating the mixture above about the melting point of a semi-crystalline polymer component or above about the glass transition temperature of an amorphous polymer component, and for mixing the mixture; and (e) a die component for extruding the mixture from the end zone.

In accordance with this invention, SSME can combine advantages and remove limitations of currently existing polymer composite and/or nanocomposite processing techniques. Without limitation, SSME can effectively exfoliate and/or disperse the filler and/or nanofiller particles in a continuous process while creating a molten extrudate that has had limited exposure to thermal degradation and can be readily post-processed. Such an attribute can eliminate hazards associated with powder handling or other issues associated with the direct powder output of SSSP. The SSME-processed polymer composites and/or nanocomposites also exhibit enhanced mechanical properties compared to TSE products containing similar filler content. In addition, materials processed via SSME can yield materials with mechanical performance as good as or better than those materials containing similar filler content processed via SSSP alone or SSSP followed by melt extrusion. Further, prior art SSSP followed by melt extrusion is limited by energy inefficiencies from two instruments. In contrast, SSME methods and related apparatus of this invention can yield relative energy savings during continuous processing.

DETAILED DESCRIPTION OF CERTAIN EMBODIMENTS

Figure 1:
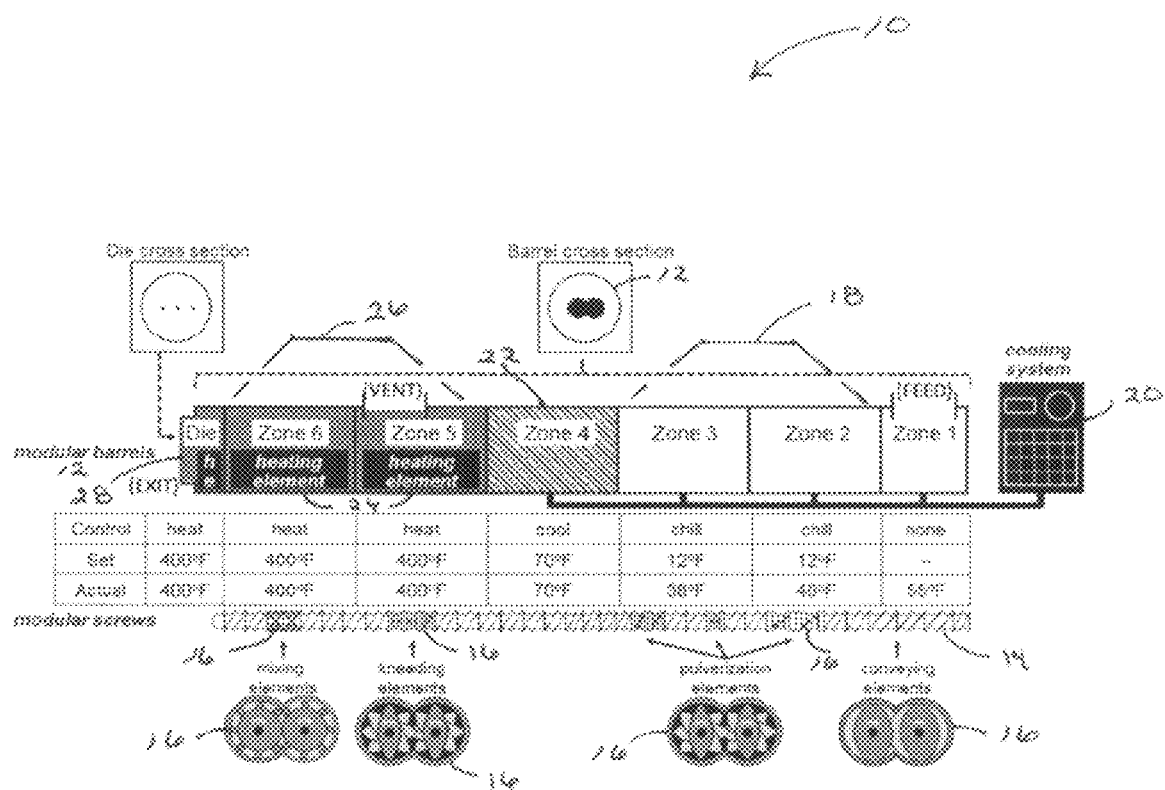
FIG. 1 shows a schematic of an instrumentation set-up and operating conditions for an SSME processing, in accordance with certain embodiment of this invention.

Certain non-limiting embodiments of this invention can be considered with reference to FIG. 1, a schematic illustration of an instrumentation set-up and operating conditions which can be used in conjunction with SSME methods of the present invention. Referring to FIG. 1, apparatus 10 has a series of modular barrels, each barrel 12 configured with at least one rotating screw 14 therein. Each such screw configuration can comprise conveying, pulverizing, kneading and mixing elements 16, or a combination of such elements. Initial zone 18 comprises at least one barrel 12 and configured screw 14, together with cooling system 20 (e.g., without limitation, a recirculating chiller). Transition zone 22 comprises at least one such barrel 12/screw 14, together with a heating element 24 (e.g., without limitation, a cartridge heater). End zone 26 independently comprises at least one such barrel 12 and screw configuration 14, together with heating element 24. A terminal die component 28 is coupled to end zone 26 for mixture extrusion. Apparatus 10 can comprise a single- or multi-screw configuration 14, with individual screw elements ranging from 1 to about 45 in number. Representative twin-screw configurations with bi-lobe elements are shown in FIG. 1. Optionally, for instance, tri-lobe screw elements can also be used.

In one such embodiment, a twin-screw extruder has modular barrel zones with individual temperature settings. The SSME processing technique sets up initial zone 18 to a temperature that creates an environment for solid-state shearing of the polymer and filler and/or nanofiller below about the melting point of semi-crystalline polymers or below about the glass transition temperature of amorphous polymers. In FIG. 1, this is schematically represented as sub-zones 1-3. A subsequent transition zone 22 has a moderate temperature setting to serve as a buffer/transition area between the initial and heated end zones. This is schematically represented as sub-zone 4 in FIG. 1. End zone 26 is set at a temperature above about the melting point of semi-crystalline polymers or above about the glass transition temperature of amorphous polymers, as typically done in conventional TSE. This is schematically represented as sub-zones 5 and 6 in FIG. 1. A resulting polymer composite/nanocomposite is advanced through die component 28 to provide a desired non-powder extrudate.

The rotating screws of an extruder apparatus can also be modular. For example, a screw configuration with pulverizing elements located in the initial sub-zones may be but are not necessarily chilled, melt mixing elements are concentrated in the end sub-zones, and conveying zones are distributed along the length of the apparatus to move the materials forward continuously in between the initial and end zones.

The SSME process can be described as successive cold (solid-state) pulverization and hot (melt-state) compounding in the same apparatus. The materials first enter the initial processing zone, where they remain in the solid-state as they are pulverized and mixed by high compressive and shear forces of SSSP processing. The materials then are conveyed from the initial zone to the transition zone, then to the heated end zone, where they are kneaded, mixed, and extruded in the melt state. The extrudate is similar to that of commercial TSE, and thus can be further manipulated into desired shapes, which include but are not limited to strands, pellets or films. The barrel temperature settings and screw configuration in SSME provide sufficient solid-state pulverization action that promotes superior exfoliation and dispersion of fillers and/or nanofillers, as well as melt-compounding and extrusion action to provide intimate mixing and homogenization of the resulting polymer composite and/or nanocomposite before molding into a desired end-product.

SSME of this invention is designed for the commercial production of polymer-filler composite and/or nanocomposites—whether produced by an existing process or one not yet commercialized—where significant exfoliation and/or dispersion of the filler components throughout the polymer matrix are necessary for physical property enhancements. In addition, the extrudate is suitable for applications where industrial-scale mass production and immediate shaping/molding into end-use products is important. Therefore, the SSME technique can be applied by any polymer composite and/or nanocomposite or high-performance composite manufacturer. Such composites and/or nanocomposites can be employed in various commercial fields, including (but not limited to) packaging, specialty plastics, electronics, consumer products, aerospace, and automotives. Examples include a rubber/clay nanocomposite in high-performance tennis balls, thermoset-graphite nanocomposite for EMI shielding in TV screens, and nylon-clay nanocomposite as a dashboard material in automobiles.

Examples of the Invention

The following non-limiting examples and data illustrate various aspects and features relating to the methods of the present invention, including the preparation of various polymer composites and/or nanocomposites, as are available through the methodologies described herein. In comparison with the prior art, the present methods provide results and data which are surprising, unexpected and contrary thereto. While the utility of this invention is illustrated through the use of several representative apparatus configurations and polymer and filler components processed therewith, it will be understood by those skilled in the art that comparable results are obtainable with various other apparatus configurations, polymer components and filler and/or nanofiller components, as are commensurate with the scope of this invention.

Materials and Methods

The matrix polymer for a representative nanocomposite was an LLDPE from Dow Chemical, Dowlex 2027G (MFI=4.0 g/10 min at 190° C./2.16 kg; ASTM D1238), while the organoclay (O-C) filler was Southern Clay Products Cloisite 15A quaternary ammonium salt-modified (125 meq/100 g) montmorillonite clay. Both materials were used as-received, without pre-processing or addition of compatibilizers or solvents.

Solid-state/melt extrusion (SSME) was performed using a Berstorff ZE25-UTX intermeshing, co-rotating twin screw extruder with a diameter (D) of 25 mm and a length to diameter ratio (L/D) of 34. With reference to FIG. 1, barrel temperature setting was customized to create three distinct zones along the length of the barrel. Initial zone 18, spanning the beginning length of L/D=16, was designed for solid-state pulverization; this portion of the barrel was continuously cooled at −12° C. by circulating coolant from a Budzar Industries BWA-AC10 chiller. Subsequent transition zone 22 (L/D=6) is an intermediate barrel section set at 21° C., where the materials transition from the solid- to melt-state. Finally, end zone 26 (L/D=12) is the melt extrusion zone in which the barrel was heated to 204° C. by standard cartridge-type electrical heaters. The screw configuration in the solid-state zone (zone 18) and the melt processing zone (zone 26) consisted of spiral conveying and bilobe kneading elements, as shown in FIG. 1.

To facilitate a systematic comparison, (example 1, below) the same instrument was also employed in TSE mode and SSSP mode. In TSE mode, all zones of the barrel were maintained at 193-204° C. and the screws were arranged to match the manufacturer's standard TSE configuration. In SSSP mode, all zones of the barrel were cooled by circulating coolant at −12° C., and the screws had the typical SSSP screw configuration. In all three processing cases, the screws were set to rotate at 200 rpm, and the matrix and filler materials were continuously metered into the extruder hopper upstream of zone 18 by Brabender Technologie DS28-10 and DDSR12-1 feeders, respectively. The molten extrudate generated by SSME and TSE was cooled and pelletized in a Scheer Bay BT-25 water trough/pelletizer system. Powdered output was generated in the SSSP operation.

Nominal O-C loading of the nanocomposite samples was 4 wt %. Actual clay content was determined via ash testing according to ASTM D-5630. For morphological characterization, X-ray diffraction (XRD) was conducted on 1.6 mm-thick compression molded sheets, using a PANalytical X'Pert Pro Multi-Purpose Diffractometer with CuK$\alpha$ monochromatic rays at 45 kV and 40 mA. For mechanical property characterization, tensile tests (ASTM D-1708) were performed at room temperature using a Tinius-Olsen H5K-S universal tester. Coupons were cut from 0.4 mm-thick compression molded sheets with a corresponding die from Dewes-Gumbs. The coupons were extended at a straining rate of 12.7 mm/min and data were collected at 0.06 s intervals.

Testing on polyethylene-clay nanocomposites provided results that indicate that SSME yields improved exfoliation of the filler particles and enhanced mechanical properties relative to TSE. In addition, SSME provides similar or better mechanical performance compared to SSSP alone or two-step SSSP and extrusion approach when operated at a 10-fold higher throughput rate than that of SSSP alone. Supporting data are given below.

Example 1

Polymer nanocomposites samples were prepared from linear-low density polyethylene, or LLDPE (Dowlex 2027G, Dow Chemical Company), and organically modified montmorillonite clay, or OC (Cloisite 15A, Southern Clay Products), using the four contrastive techniques outlined in Table 1, viz., (1) conventional TSE, (2) conventional SSSP, (3) SSSP followed by single-screw extrusion (SSE), and (4) the new SSME. The nanocomposite samples were fabricated using a Krauss-Maffei Berstorff ZE25-UTX extruder. The nominal filler content was targeted to be 4 wt % in all cases. The actual filler contents in each sample were measured by ash content testing, in accordance with ASTM D5630.

TABLE 1

Process Variables for the LLDPE/O-C Nanocomposite Fabrication Methods

| Method | Target Filler Content (wt %) | Actual Filler Content (wt %) | Throughput (g/hr) | Output Form |
|---|---|---|---|---|
| TSE | 4.0 | 2.8 ± 0.1 | 3200 | Molten strands |
| SSSP | 4.0 | 2.8 ± 0.2 | 200 | Powder |
| SSSP/SSE | 4.0 | 2.8 ± 0.2 | 200 | Powder, then molten strands |
| SSME | 4.0 | 2.8 ± 0.1 | 2500 | Molten strands |

Processing Variables: Table 1 shows process variables, output forms, and throughputs used to produce LLDPE/clay nanocomposites by several methods, three methods using a single apparatus, and one, SSSP/SSE (single-screw extrusion) in two sequential apparatuses, with the powdery SSSP output being fed as input into a single-screw extruder.

Example 2

Figure 2:
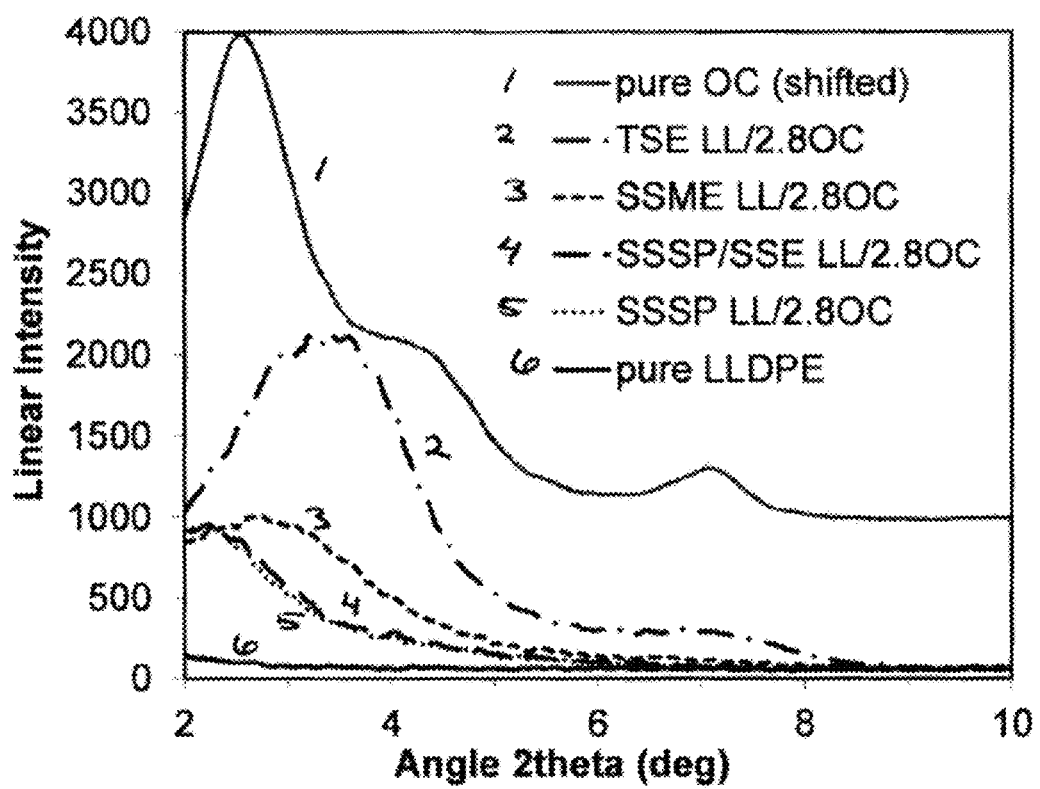
FIG. 2 shows XRD Curves for pure organically-modified clay (O-C), pure LLDPE, and LLDPE-O-C nanocomposites prepared by different techniques

Nanocomposite Morphology: X-Ray diffraction (XRD; 40 kV, 45 mA, CuKα) was employed to investigate the filler morphology of the nanocomposite samples. The results are plotted in FIG. 2. Based on the governing Bragg's Law, the peak(s) within the 2θ range of 2-10° signify the presence of agglomerated, non-exfoliated clay particles, with a lower the peak height on the XRD curve corresponding to a greater degree of exfoliation (and dispersion) of the filler. The results in FIG. 2 show that the nanocomposite sample prepared by TSE exhibits a relatively large characteristic clay peak, indicating that TSE is not effective for exfoliating and/or dispersing the clay particles. In contrast, the nanocomposite samples prepared by SSSP and SSSP/SSE exhibit reduced peak heights. Thus, SSSP processing is more effective at exfoliating and/or dispersing the clay fillers in the polymer. The nanocomposite sample prepared by the SSME process also shows a reduced characteristic clay peak height, indicative of effective exfoliation of clay particles.

Example 3

Figure 3:
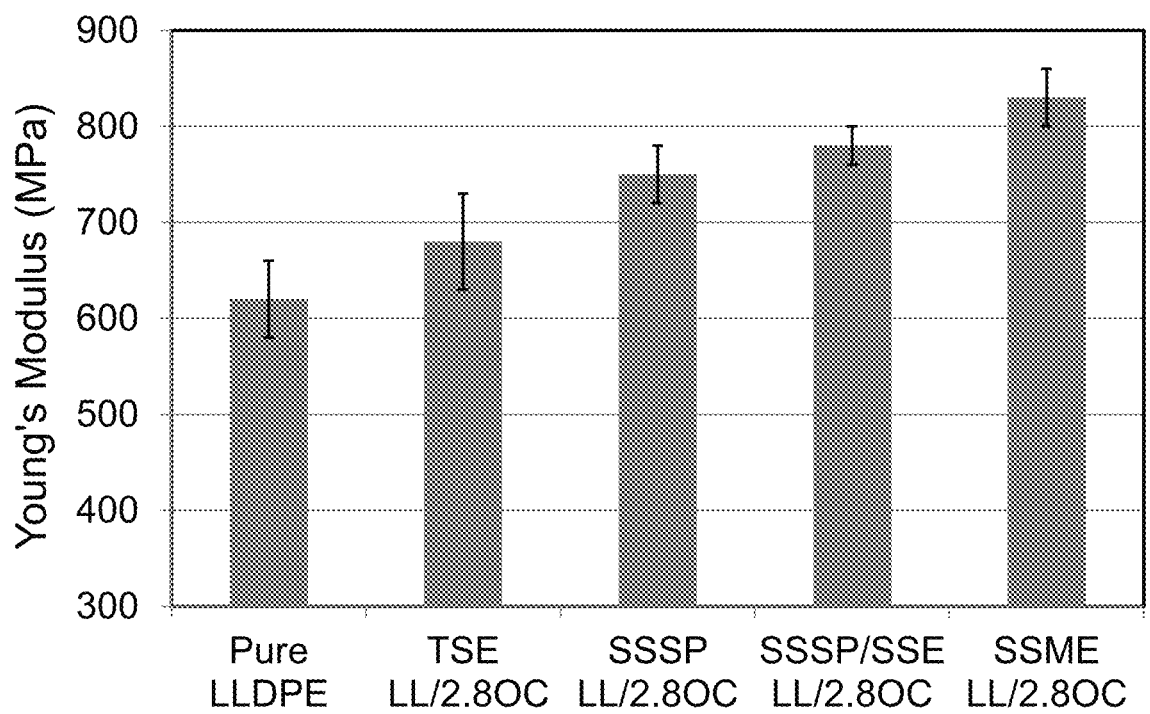
FIG. 3 shows a comparison of the Young's modulus values of pure LLDPE and LLDPE-O-C nanocomposites prepared by different techniques.

Physical Properties: Uniaxial tensile testing on the compression-molded specimens of the LLDPE-OC nanocomposites was conducted based on ASTM D1708. Average Young's modulus values, which represent the stiffness of the samples, are presented in FIG. 3 (The error bars represent one standard deviations.). Processing LLDPE with clay, leading to products with 2.8 wt. % OC content, by SSME yields significant enhancement in stiffness (i.e., higher Young's modulus) relative to pure LLDPE and LLDPE-OC nanocomposites made by TSE.

The SSME methods of this invention can effectively produce polymer composites and/or nanocomposites that have well-exfoliated and/or well-dispersed filler morphologies. As a result, the mechanical properties of the composites and/or nanocomposites are superior to those prepared by conventional TSE processing techniques and comparable to SSSP alone. Moreover, the SSME process yields forms of output, e.g., strands, pellets, or films, that increases ease of handling and feeding for some applications, such as injection molding of output to shape/mold composites and/or nanocomposites into final products, and eliminates any hazards of dealing with polymeric powders.

What is claimed is:

1. An extrusion method, said method comprising:
    feeding a mixture of a polymer component and a filler component into an extruder apparatus;
    solid-state shearing said mixture in a zone of said extruder apparatus at a temperature less than about the melting point or less than about the glass transition temperature of said polymer component;
    warming said mixture in another zone of said extruder apparatus;
    mixing and heating said mixture at a temperature above about the melting point or above about the glass transition temperature of said polymer component;
    and extruding said mixture, wherein steps (a)-(e) are performed in one continuous process in the same apparatus without transfer of said mixture to another apparatus.

2. The method of claim 1, wherein said mixture is kneaded in step (d).

3. The method of claim 1, wherein steps (a)-(e) are performed with said apparatus having a single or multi-screw extruder.

4. The method of claim 1 wherein said filler component is selected from cellulose, rice husk ash, talc, silica, silicon carbide, silicon nitride, glass fibers, glass particles, alumina, zirconia, boron, metallic particles, clay, modified clay, graphite, modified graphite, graphene, carbon black, carbon fiber, fullerenes, single-walled carbon nanotubes, multi-walled carbon nanotubes and combinations thereof.

5. The method of claim 4 wherein said filler component is nanodimensioned.

6. The method of claim 1 wherein said filler component comprises about 0.01 wt. % to about 99.99 wt. % of said mixture.

7. The method of claim 1 wherein said polymer component is selected from polyesters, polyolefins, polyamides, epoxies, polycarbonates, polyacrylates, polyvinyls, polyethers, polyacrylonitriles, polyacetals, polysiloxanes, polyetherketones, polymides, polyurethanes, polystyrenes, elastomers and copolymers thereof, combinations of said polymers, combinations of said copolymers and combinations of said polymers and copolymers.

8. A method of using a unitary solid-state shearing and melt-state extruder apparatus to prepare a polymer composite, said method comprising:
    providing a unitary extruder apparatus comprising a solid-state shearing zone and a melt-state extrusion zone;
    introducing a polymer component and a filler component into said unitary apparatus to provide a mixture thereof;
    solid-state shearing said mixture in an initial zone of said unitary apparatus, said zone at a temperature sufficient to maintain said polymer component in a solid state during said shearing;
    warming said mixture in a transition zone of said unitary apparatus, said mixture warmed at a temperature less than about the melting point or less than about the glass transition temperature of said polymer component; and
    heating said mixture in an end zone of said unitary apparatus, at a temperature above about the melting point or above about the glass transition temperature of said polymer component, said heating with continued mixing of said mixture.

9. The method of claim 8 wherein said unitary apparatus comprises a single or multi-screw extruder couration.

10. The method of claim 8 wherein said filler component is selected from cellulose, rice husk, ash, talc, silica, silicon carbide, silicon nitride, glass fibers, glass particles, alumina, zirconia, boron, metallic particles, clay, modified clay, graphite, modified graphite, graphene, carbon black, carbon fiber, fullerenes, single-walled carbon nanotubes, multi-walled carbon nanotubes and combinations thereof.

11. The method of claim 9 wherein said filler component is nanodimensioned.

12. The method of claim 8 wherein said filler component comprises about 0.01 wt. % to about 99.99 wt. % of said mixture.

13. The method of claim 12 wherein said filler component comprises about 0.5 wt. % to about 10.0 wt. % of said mixture.

14. The method of claim 8 wherein said polymer component is selected from polyesters, polyolefins, polyamides, epoxies, polymides, polyurethanes, polystyrenes, polycarbonates, polyacrylates, polyvinyls, polyethers, polyacrylonitriles, polyacetals, polysiloxanes, polyetherketones, elastomers and copolymers thereof, combinations of said polymers, combinations of said copolymers and combinations of said polymers and copolymers.

* * * * *